(12) United States Patent
Durham et al.

(10) Patent No.: US 6,240,489 B1
(45) Date of Patent: May 29, 2001

(54) METHOD FOR IMPLEMENTING A PSEUDO LEAST RECENT USED (LRU) MECHANISM IN A FOUR-WAY CACHE MEMORY WITHIN A DATA PROCESSING SYSTEM

(75) Inventors: Christopher McCall Durham; Brian Patrick Hanley, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,373

(22) Filed: Feb. 24, 1999

(51) Int. Cl.[7] .................................................. G06F 12/00
(52) U.S. Cl. ..................... 711/136; 711/129; 711/133; 711/144
(58) Field of Search ................................. 711/136, 144, 711/129, 133–134, 158–160, 151

(56) References Cited

U.S. PATENT DOCUMENTS 5,765,191 * 6/1998 Loper et al. ......................... 711/136
5,875,464 * 2/1999 Kirk ..................................... 711/129

* cited by examiner

Primary Examiner—Do Hyun Yoo
Assistant Examiner—Mehdi Namazi
(74) Attorney, Agent, or Firm—Casimer K. Salys; Bracewell & Patterson, L.L.P.

(57) ABSTRACT

A method for implementing a pseudo least recent used mechanism in a four-way cache memory within a data processing system is disclosed. Within a four-way set associative cache memory, each congruence class contains four cache lines. Each congruence class within the cache memory is associated to a least recently used (LRU) field that has four bits. Each of four cache lines within the congruence class is then assigned with a respective set number. The set number of a cache line designated as a least recently used set among the four cache lines is stored in two bits of the LRU field. The set number of a cache line designated as a most recently used set among the four cache lines is stored in another two bits of the LRU field. In response to a determination that the set number of the least recently used set is higher than the set number of the most recently used set, one of the remaining two cache lines that has a higher set number is assigned to be a second least recently used set.

8 Claims, 4 Drawing Sheets

|  | LRU | LRU+1 | MRU-1 | MRU |
|---|---|---|---|---|
| cycle a | 1 | (0) | 2 | 3 |
| cycle b | [1] | 2 | 3 | 0 |
| cycle c | 2 | 3 | (0) | 1 |
| cycle d | [2] | 3 | 1 | 0 |
| cycle e | 3 | 1 | 0 | 2 |

(○) = read access
[ ] = write access

*Fig. 3*

|  | LRU | LRU+1 | MRU-1 | MRU |
|---|---|---|---|---|
| cycle a | 1 | (0) | 2 | 3 |
| cycle b | [1] | 3 | 2 | 0 |
| cycle c | 3 | 2 | (0) | 1 |
| cycle d | [2] | 3 | 1 | 0 |
| cycle e | 3 | 1 | 0 | 2 |

(○) = read access
[ ] = write access

*Fig. 7*

METHOD FOR IMPLEMENTING A PSEUDO LEAST RECENT USED (LRU) MECHANISM IN A FOUR-WAY CACHE MEMORY WITHIN A DATA PROCESSING SYSTEM

BACKGROUND OF THE INVENTION

1. Technical Field

The present disclosure relates to a method for improving data processing in general and, in particular, to a method of implementing a pseudo Least Recently Used (LRU) mechanism in a cache memory within a data processing system. Still more particularly, the present disclosure relates to a method for implementing a pseudo LRU mechanism in a four-way cache memory within a data processing system.

2. Description of the Prior Art

A data processing system typically includes both a system memory and a cache memory. A cache memory is a small and relatively high-speed memory interposed between a processor and the system memory. Information such as data or instructions may be copied from a portion of the system memory into the cache memory so that the information will be available to the processor in a relatively short amount of time when the requested information resides in the cache memory.

However, if the information requested by the processor cannot be found in the cache memory (i.e., a cache miss), the requested information must be obtained from the system memory. After the information has been obtained from the system memory, a copy of the information may also be placed in the cache memory for future usage, in addition to the immediate usage by the processor. Thus, when all possible storage locations for the information within the cache memory are completely filled, some of the information already stored in the cache memory has to be replaced by the new information via an operation known as linefill. Needless to say, it is important to have a strategy to decide what specific information already stored in the cache memory needs to be discarded in order to make room for the new information. Generally speaking, usually either a Least Recently Used (LRU) or a pseudo LRU strategy is employed to select a cache line of information to be replaced when a cache miss occurs. This is because statistical data has shown that for low associativity caches (caches that are configured as four-way set associative or less), an LRU type of replacement scheme can best minimize the cache miss ratio when compared to other cache replacement schemes such as random replacement or round-robin. The present disclosure provides a method for implementing a pseudo LRU cache replacement mechanism with fewer bits than prior art implementations.

SUMMARY OF THE INVENTION

Within a four-way set associative cache memory, each congruence class contains four cache lines. In accordance with a method of the present invention, each congruence class within the cache memory is associated to a least recently used (LRU) field that has four bits. Each of four cache lines within the congruence class is then assigned a respective set number. The set number of a cache line designated as a least recently used set among the four cache lines is stored in two bits of the LRU field. The set number of a cache line designated as a most recently used set among the four cache lines is stored in another two bits of the LRU field. In response to a determination that the set number of the least recently used set is higher than the set number of the most recently used set, one of the remaining two cache lines that has a higher set number is assigned to be a second least recently used set.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 depicts an example of a true LRU scheme;

FIG. 7 depicts an example of a pseudo LRU scheme according to a preferred embodiment of the present invention.

DETAILED DESCRIPTION OF A PREFERRED EMBODIMENT

The present invention may be implemented in a variety of processors having at least one cache memory. The processor may be, for example, a reduced instruction set computer (RISC) processor or a complex instruction set computer (CISC) processor. For the purpose of illustration, a preferred embodiment of the present invention, as described below, is implemented on a RISC processor, such as one of the PowerPC™ family of processors that are manufactured by the International Business Machines Corporation of Armonk, N.Y.

Figure 1:
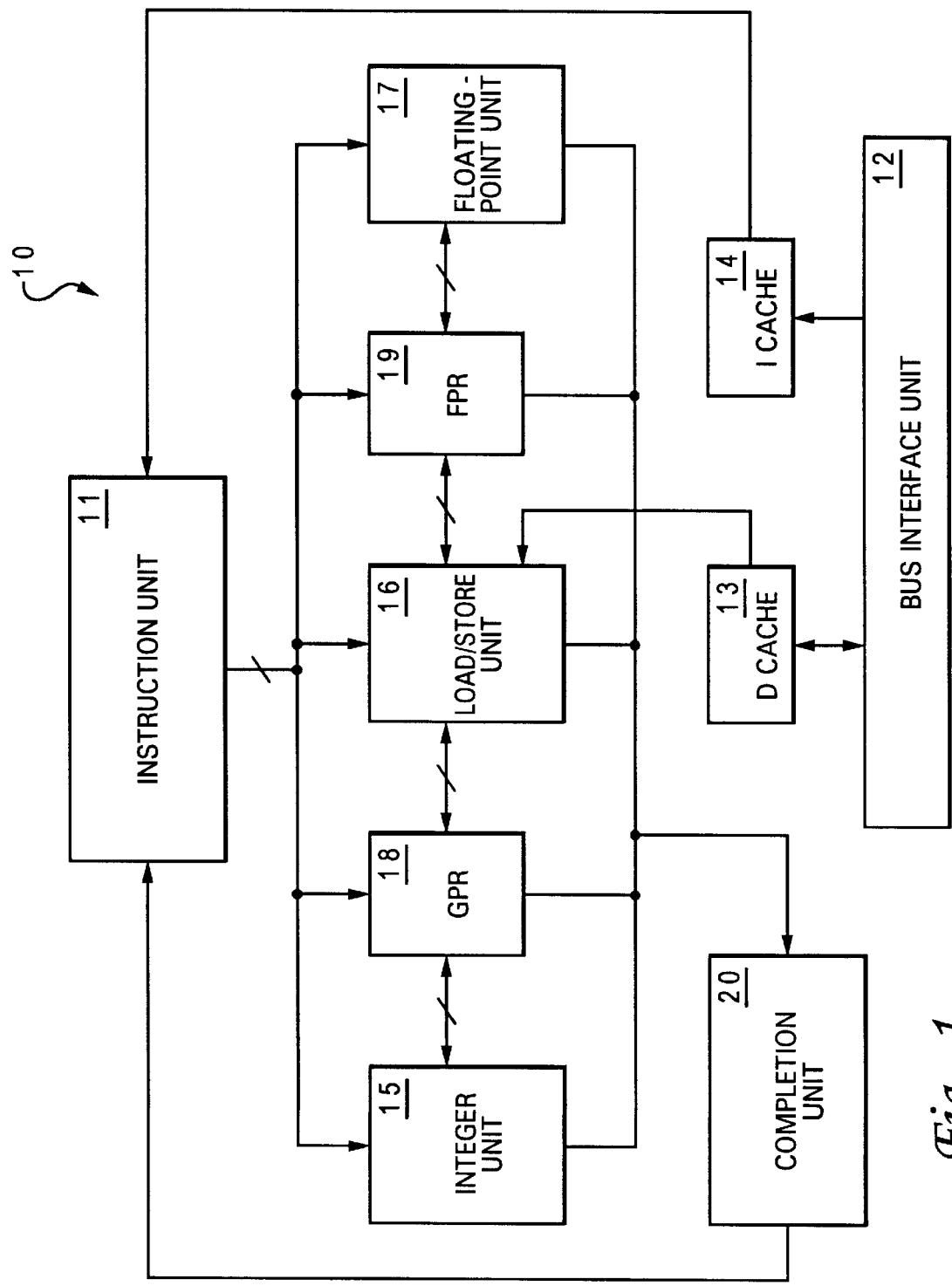
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a system memory (not shown). Instruction cache 14 is further coupled to an instruction unit 11 which fetches instructions from instruction cache 14 during each execution cycle.

Processor 10 also includes at least three execution units, namely, an integer unit 15, a load/store unit 16, and a floating-point unit 17. Each of execution units 15–17 can execute one or more classes of instructions, and all execution units 15–17 can operate concurrently during each processor cycle. After execution has terminated, execution units 15–17 store data results to a respective rename buffer, depending upon the instruction type. Then, any one of execution units 15–17 may signal a completion unit 20 that the instruction unit has finished execution of an instruction. Finally, instructions are completed in program order, and result data are transferred from the respective rename buffer to a general purpose register 18 or a floating-point register 19, accordingly.

Figure 2:
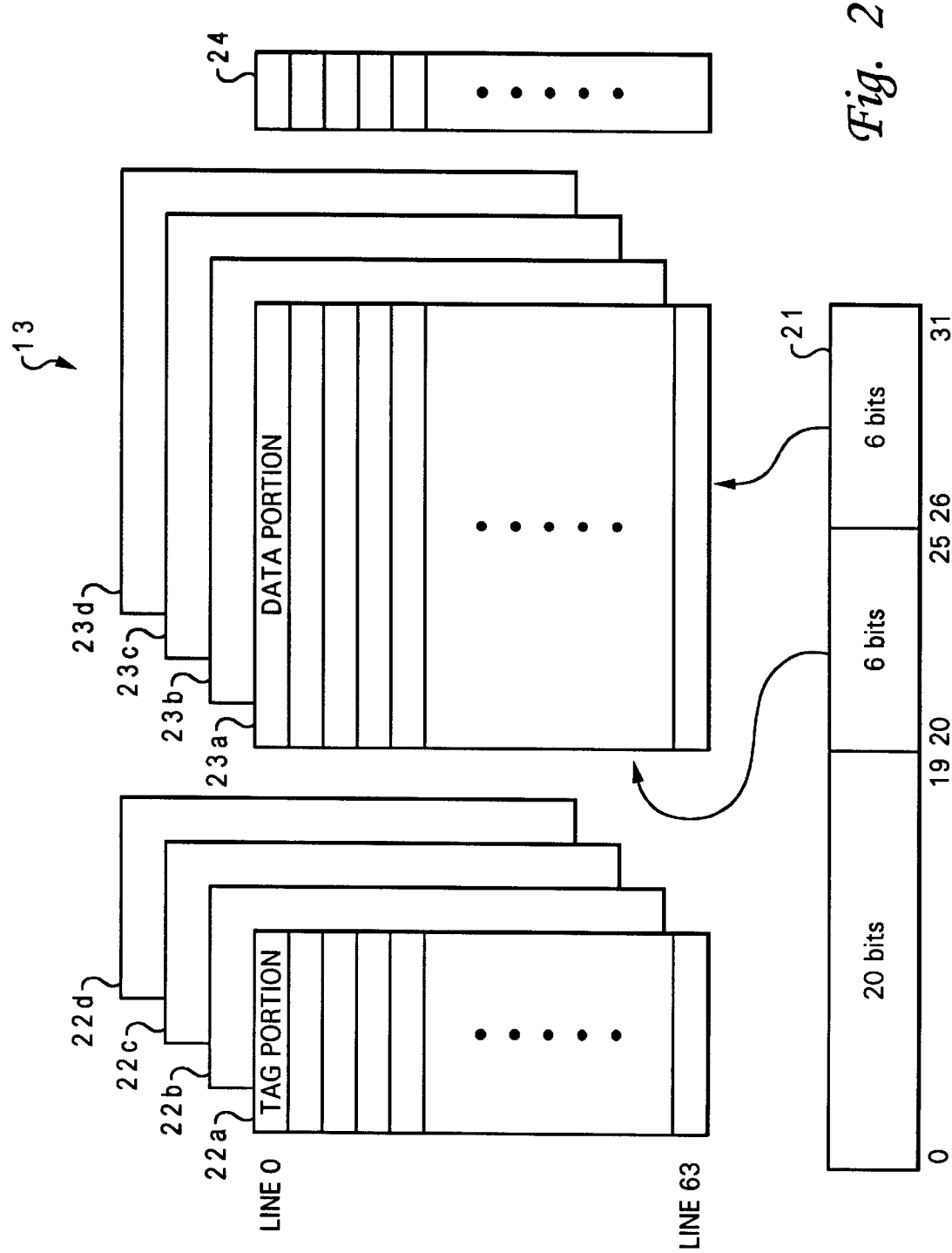
FIG. 2 is a block diagram of a cache memory within the processor of FIG. 1, according to an illustrative embodiment of the present disclosure.

With reference now to FIG. 2, there is depicted a block diagram of the organization of data cache 13 according to an illustrative embodiment of the disclosure. Data cache 13 is configured as a four-way set associative cache having way 0, way 1, way 2, and way 3. In other words, there are four cache lines within each congruence class of data cache 13. Each way of data cache 13 is further divided into two portions, namely, a tag portion and a data portion. As shown in FIG. 2, the tag portion includes tag set 22a, tag set 22b, tag set 22c, and tag set 22d for way 0, way 1, way 2, and way 3, respectively. Similarly, the data portion includes data set 23a, data set 23b, data set 23c, and data set 23d for way 0, way 1, way 2, and way 3, respectively. Each of tag set 22a–22d corresponds to one of data set 23a–23d. Because all tag sets 22a–22d are of identical configuration and all data sets 23a–23d are of identical configuration, only tag set 22a and data set 23a will be described in detail as follows.

Each of tag set 22a and data set 23a has 64 cache lines, from line 0 to line 63, and each cache line is indexed by bits 20–25 of an address 21. Each cache line of data set 23a is 64 bytes (or 16 words) wide while each cache line of tag set 22a is only 20 bits wide. Each cache line in data set 23a contains actual data that may be required by a processing unit, such as IU 15, LSU 16 or FPU 17 from FIG. 1, and each byte within the cache line is indexed by bits 26–31 of address 21. On the other hand, each cache line in tag set 22a contains an address tag that is utilized for comparison with bits 18–31 of address 21 in order to determine whether there is a cache "hit" or "miss." Incidentally, a match between an address tag in one of tag sets 22a–22d and bits 18–31 of address 21 means a cache "hit."

In addition to the tag portion and the data portion, each cache may also contain several other bits that are intended for various purposes. For example, there may be two state bits (not shown) per cache line for implementing the four-state MESI (modified, exclusive, shared, and invalid) protocol. However, for the sake of simplicity along with the fact that the implementation of such bits are well known to those skilled in the art of cache memory design, the illustration of those bits in FIG. 2 is omitted.

In order to implement an LRU cache replacement mechanism (whether a true LRU replacement scheme or a pseudo LRU replacement scheme) for data cache 13, an LRU field 24 is associated with each congruence class of data cache 13 in order to track the state of utilization of cache lines within the congruence class. Because there are four caches within each congruence class, there are four possible states of utilization for each cache line: the least recently used state, the second least recently used state, the second most recently used state, and the most recently used state, which are denoted by LRU, LRU+1, MRU-1 and MRU, respectively. The state of utilization of a cache line within a congruence class can be determined by simply interrogating the LRU field, such as LRU field 24, of that congruence class.

Figure 4:
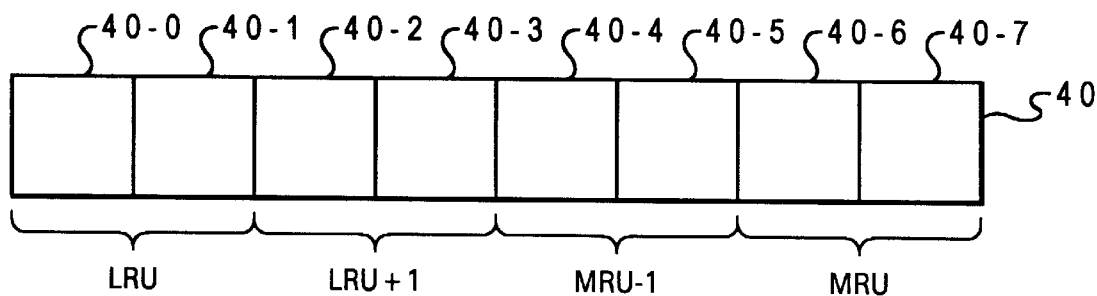
FIG. 4 depicts a prior art implementation of a true LRU replacement mechanism for a four-way cache memory.

Referring now to FIG. 3, there is illustrated an example of a true LRU scheme. In cycle a, way 1 of a congruence class within data cache 13 is the LRU, way 0 of the same congruence class within data cache 13 is the LRU-1, way 2 of the same congruence class within data cache 13 is the MRU-1, and way 3 of the same congruence class within data cache 13 is the MRU. In cycle b, after a read access to way 0, way 0 becomes the MRU, way 3 shifts down to be the MRU-1, and way 2 shifts down to be the LRU+1 while way 1 remains the LRU. In cycle c, after a write access to way 1, way 1 becomes the MRU, way 0 shifts down to be the MRU-1, and way 3 shifts down to be the LRU-1 while way 2 becomes the LRU. In cycle d, after a read access has been made to way 0 of the cache lines, way 0 becomes the MRU, way 1 shifts down to be the MRU-1, way 3 and way 2 remain the LRU+1 and LRU, respectively. In cycle e, after a write access to way 2, way 2 becomes the MRU, way 0 shifts down to become the MRU-1, way 1 shifts down to the LRU-1, and way 3 becomes the LRU. Under the true LRU scheme, the information within the cache line that is in the LRU position will always be replaced by new information obtained from the system memory when there is a linefill operation, usually induced by a cache "miss." With reference now to FIG. 4, there is illustrated a prior art implementation of a true LRU replacement mechanism for a four-way cache memory. As shown, LRU field 40 comprises eight bits. For the purpose of LRU scheme implementation, each tag within tag sets 22a–22d is assigned a two-bit set number. For example, tag set 22a is assigned set 00, tag set 22b is assigned set 01, tag set 22c is assigned set 10, and tag set 22d is assigned set 11. Each of the set numbers will be placed in LRU field 40 in accordance with the state of utilization of its associated cache line. As shown, both bit 40-0 and bit 40-1 are utilized to keep track of the LRU set among tag sets 22a–22d;

both bit 40-2 and bit 40-3 are utilized to keep track of the second LRU set among tag sets 22a–22d; both bit 40-4 and bit 40-5 are utilized to keep track of the second MRU set among tag sets 22a–22d; and both bit 40-6 and bit 40-7 are utilized to keep track of the MRU set among tag sets 22a–22d.

Figure 5:
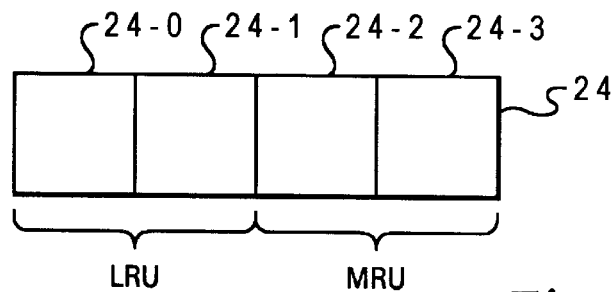
FIG. 5 is an implementation of a pseudo LRU replacement mechanism for a four-way cache memory, in accordance with a preferred embodiment of the present invention.

Referring now to FIG. 5, there is illustrated an implementation of a pseudo LRU replacement mechanism for a four-way cache memory, in accordance with a preferred embodiment of the present invention. As shown, only the LRU set and the MRU set are recorded in LRU field 24. Specifically, bits 24-0 and 24-1 are utilized to keep track of the LRU set among tag sets 22a–22d, and both bits 24-2 and 24-3 are utilized to keep track of the MRU set among tag sets 22a–22d. The set numbers for tag sets 22a–22d may be assigned as 00, 01, 10, and 11. The two non-recorded sets are the second LRU set and the second MRU set. A rotating method is then utilized to assign the state of utilization of the second LRU set and the second MRU set such that all four sets will eventually roll through the ordering sequence.

Figure 6:
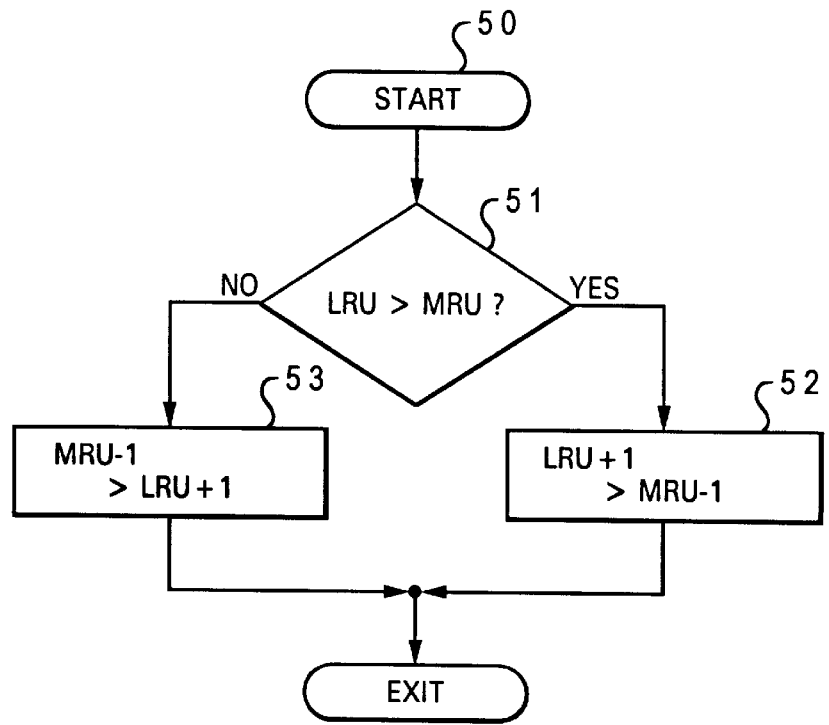
FIG. 6 is a high-level logic flow diagram of a rotating method for assigning the state of utilization of two non-recorded cache line sets, in accordance with a preferred embodiment of the present invention.

With reference now to FIG. 6, there is illustrated a high-level logic flow diagram of a rotating method for assigning the state of utilization of the two non-recorded sets mentioned above, in accordance with a preferred embodiment of the present invention. Starting at block 50, a determination is made as to whether or not the set number stored in bits 24-0 and 24-1 (i.e., the LRU set) is greater than the set number stored in bits 24-2 and 24-3 (i.e., the MRU set), as shown in block 51. The set numbers for the four cache lines within a congruence class, as mentioned above, are 00, 01, 10, and 11. If the set number stored in the LRU set is higher than the set number stored in the MRU set, then one of the two non-recorded sets that has a higher set number should be the second LRU set, as depicted in block 52. Otherwise, if the set number stored in the LRU set is lower than the set number stored in the MRU set, then one of the two non-recorded sets that has a higher set number is designated as the second MRU set, as illustrated in block 53.

Referring now to FIG. 7, there is illustrated an example of a pseudo LRU cache replacement scheme according to a preferred embodiment of the present invention. Using the same access sequence example as depicted in FIG. 3, FIG. 7 illustrates the set numbers associated with each of the usage indications under the pseudo LRU cache replacement scheme of the present invention. As shown, the set numbers in FIG. 7 deviate from those of FIG. 3 only in cycles b and c. As the name implies, the pseudo LRU cache replacement scheme of the present invention does not provide exact ordering information; however, only four bits are needed to implement the pseudo LRU scheme and the decode timing latency for determining the LRU set is dramatically reduced.

As has been described, the present invention provides an improved method for implementing a pseudo LRU mechanism in a four-way cache memory within a data processing system. By using only four bits to implement a pseudo LRU cache replacement mechanism, storage area on an integrated device is reduced.

While the invention has been particularly shown and described with reference to a preferred embodiment, it will be understood by those skilled in the art that various changes in form and detail may be made therein without departing from the spirit and scope of the invention. For example, it should be understood by those skilled in the art that the present invention can be implemented with the position of block 52 and block 53 in FIG. 6 interchanged. Furthermore, LRU field 24 in FIG. 5 can be utilized to keep track of any two of the LRU, LRU+1, MRU−1, and MRU sets, other than the LRU and MRU sets as illustrated. For example, LRU field 24 can be utilized to keep track of the MRU and MRU−1 sets.

What is claimed is:

1. A method of implementing a pseudo least recently used (LRU) cache line replacement scheme in a cache memory, said method comprising the steps of:

associating an LRU field with a congruence class within said cache memory, wherein said congruence class contains four cache lines, wherein said LRU field includes no more than four bits;

assigning each of said four cache lines within said congruence class a respective set number;

storing a set number of a first set among said four cache lines in two bits of said LRU field;

storing a set number of a second set among said four cache lines in another two bits of said LRU field; and alloting one of two remaining cache lines having a higher set number to be a third set in response to a determination that said set number of said first set is higher than said set number of said second set.

2. The method according to claim 1, wherein said first set is a least recently used set and said second set is a most recently used set.

3. The method according to claim 1, wherein said third set is a second most recently used set.

4. The method according to claim 1, wherein said third set is a second least recently used set.

5. A cache memory having a pseudo least recently used (LRU) cache line replacement scheme, said cache memory comprising:

an LRU field associated with a congruence class within said cache memory, wherein said congruence class contains four cache lines, wherein said LRU field includes no more than four bits;

means for assigning each of said four cache lines within said congruence class a respective set number;

means for storing a set number of a first set among said four cache lines in two bits of said LRU field; and means for storing a set number of a second set among said four cache lines in another two bits of said LRU field; and means for allotting one of two remaining cache lines having a higher set number to be a third set in response to a determination that said set number of said first set is higher than said set number of said second set.

6. The cache memory according to claim 5, wherein said first set is a least recently used set and said second set is a most recently used set.

7. The cache memory according to claim 5, wherein said third set is a second most recently used set.

8. The cache memory according to claim 5, wherein said third set is a second least recently used set.

* * * * *